Sept. 24, 1940. E. T. HERMANN 2,215,962
METHOD OF FORMING FLUID PERVIOUS CERAMIC BODIES
Filed July 26, 1937 2 Sheets-Sheet 1
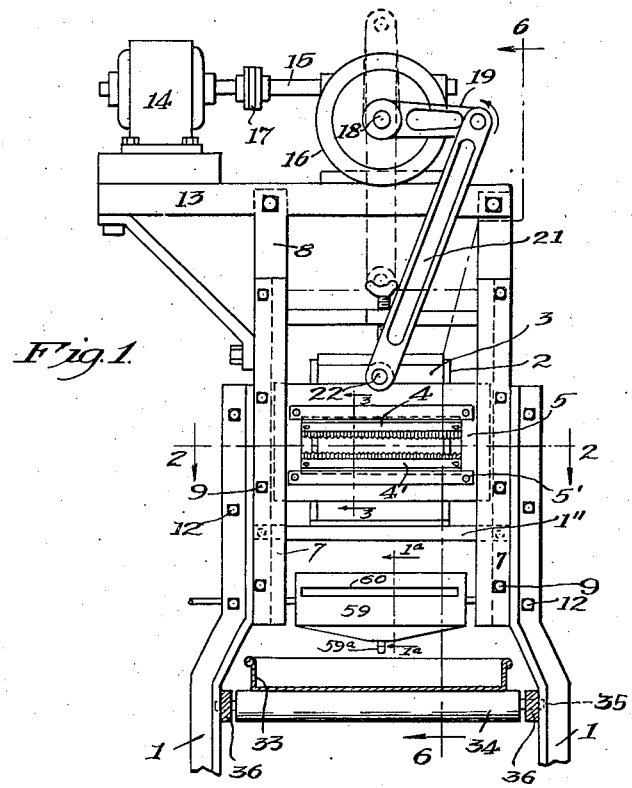
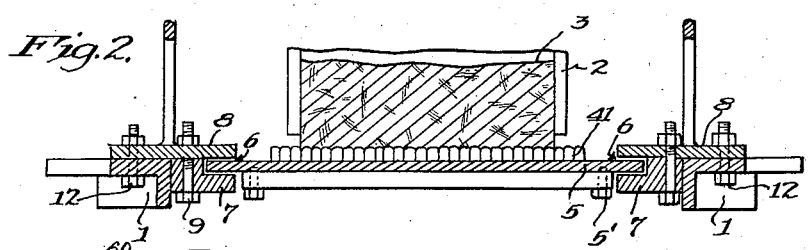
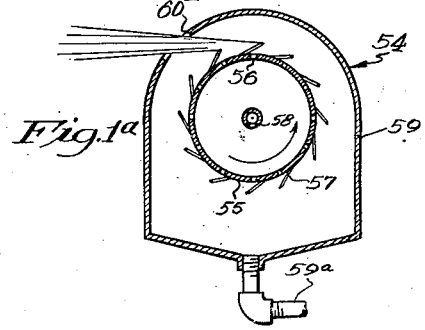
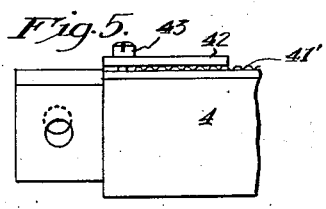
INVENTOR.
Earnest T. Hermann,
BY Arthur P. Knight and
Alfred W. Knight
ATTORNEYS.

Sept. 24, 1940.     E. T. HERMANN     2,215,962
METHOD OF FORMING FLUID PERVIOUS CERAMIC BODIES
Filed July 26, 1937     2 Sheets-Sheet 2
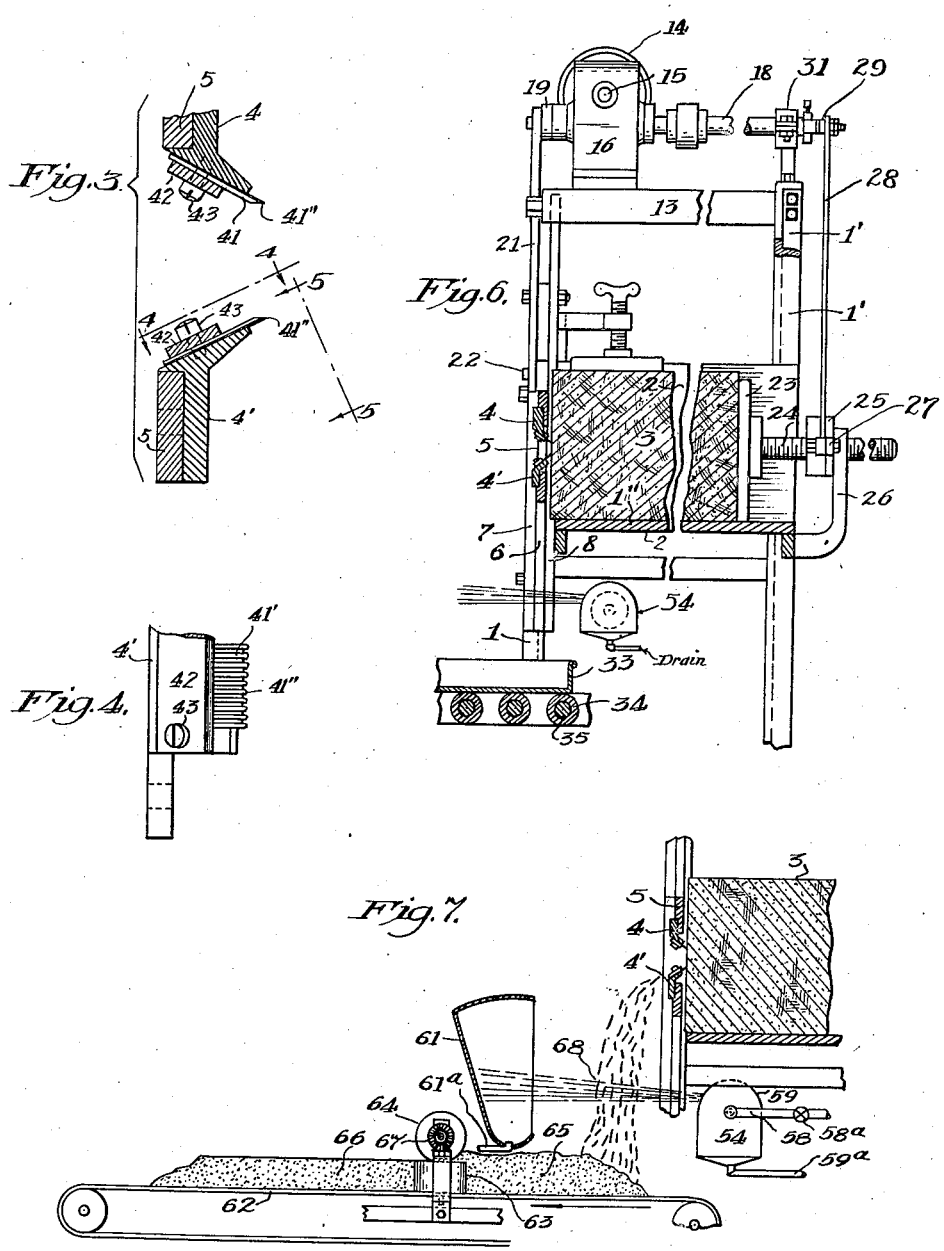
INVENTOR.
Earnest T. Hermann,
BY
ATTORNEYS.

Patented Sept. 24, 1940

2,215,962

UNITED STATES PATENT OFFICE 2,215,962

METHOD OF FORMING FLUID PERVIOUS CERAMIC BODIES

Earnest T. Hermann, El Segundo, Calif.

Application July 26, 1937, Serial No. 155,744

4 Claims. (Cl. 25—156)

This invention pertains to fluid pervious bodies for acoustic or other purposes, and pertains more particularly to a fluid pervious body of heat-bonded ceramic composition.

The principal object of the invention is to provide a novel and advantageous method of forming a particular type of ceramic fluid pervious material. A more specific object of the invention is to provide a ceramic fluid pervious body having a high percentage of mutually intercommunicating voids therewithin open to free communication with the medium surrounding said body at the surface of said body, composed of intermingled and supportingly interbonded fragmentary or filamentary particles of heat-bonded argillaceous material, for use in industry and the arts as an acoustic material of particularly high sound-absorbing characteristics, as a matrix for the support of catalytic agents, contact materials or the like, as a filtration medium, as kiln "furniture" for the support of ceramic ware during firing, as "granite" in septic tanks for harboring "friendly" bacteria while permitting large fluid flow, or for other purposes for which the structure of such a body renders it suitable.

A further object of the invention is to provide a method of forming a ceramic fluid pervious body in which the particles of which the body is formed are prepared by subdivision of a plastic body of argillaceous material followed by the production of a plastic interbond of the particles, a molding of a mass of the particles to the desired shape, and the subsequent firing of the body to produce the desired heat bond in an integration of the individual particles to a unitary, fluid pervious body.

In the present application, the method will be directed to the formation of ceramic fluid pervious bodies of that class adapted for use as acoustic material, and in this connection references will be made to the internal surfaces of the various bodies as "reflecting surfaces," which surfaces, dependent upon the use to which a particular body may be put, may serve in a particular manner according to that use, as, in the case of the use of such bodies as a matrix for the support of a catalytic agent or the like, said surfaces may play the part of contact surfaces. The restriction of the present description to the formation of this particular type of fluid pervious body is made to avoid a duplication of description, and it will be understood that no limitation of the ceramic bodies produced according to the method of my invention to any particular use is either expressed or implied, inasmuch as the alternative uses of the bodies will be apparent to those skilled in the art.

Throughout the specification and claims of this application, the term "particle" is used in the sense of a unitary body constituting an element of the built-up mass. It will be understood that each of the so-called "particles" is composed of a plurality of smaller grains or particles of argillaceous material, either with or without any added material as subsequently brought out. Each of such "particles" is torn, cut, shaved or otherwise formed as an agglomerate mass of such smaller grains, and said agglomerate mass is subsequently altered to an integral mass on firing to produce a ceramic bond between the small aggregated grains. The bonding of the grains within the particles preferably takes place during the firing operation employed to secure an integral bond between the individual particles to form the completed fluid pervious body, as more fully described hereinafter.

The process of the present invention comprises, essentially, the steps of effecting a plastic subdivision of a plastic or semi-plastic argillaceous body in the formation of discrete particles of any desired shape, the treatment of these particles to produce a more highly plastic surface condition thereof, the placement of the particles in plastically interbonded relation, drying the same, and subsequently subjecting the same to a firing operation to produce a heat-bonded integration of the particles to produce the desired ceramic body. The firing operation produces the desired ceramic bond within the individual particles, as well as the ceramic bond between the particles to produce the desired integration of the body, according to recognized ceramic practice.

This application is a continuation-in-part of my co-pending applications, Serial Nos. 528,224, filed April 6, 1931 (issued October 12, 1937, as Patent No. 2,095,252), and 548,905 filed July 1, 1931 (issued July 27, 1937, as Patent No. 2,087,973).

Other objects of the invention will be brought out in the ensuing description, or will be apparent therefrom. The accompanying drawings illustrate certain means which may be employed to carry out the process of this invention, and referring thereto:

Fig. 1 is a front elevation of a form of particle-producing device useful according to the present invention;

Fig. 1a is a sectional detail of one element thereof, taken on line 1a—1a in Fig. 1;

Fig. 2 is a transverse sectional view taken on line 2—2 in Fig. 1;

Fig. 3 is a vertical detail thereof, in section, taken on line 3—3 in Fig. 1;

Fig. 4 is a view taken on line 4—4 of Fig. 3;

Fig. 5 is a view taken on line 5—5 of Fig. 3;

Fig. 6 is a partly sectional side elevation of the device, taken on line 6—6 in Fig. 1; and Fig. 7 is a side elevation of the device, partly broken away, showing one form of apparatus for shaping the shaved particles into block form.

Referring to the drawings, the particle-producing device may comprise forward and rearward frame members 1 and 1', providing support for a container 2 by means of frame cross-members 1", said container being adapted to receive a body 3 of plastic argillaceous material in the form of an elongated block. The device further comprises a plurality of shaving-blade-holders 4 and 4' provided with cutting blades 41 adjustably secured thereto, said holders being secured as by means of bolts 5' to a cross-head 5 so disposed as to be movable vertically across the face of the block 3. The crosshead 5 may conveniently have its ends disposed within a slot 6 defined by parallel guide bars 7 and 8 secured together by any suitable means such as, for example, bolts 9, each of said guide bars 8 being secured to the forward vertical frame members 1 by means of bolts 12.

Driving means, providing a vertical reciprocal movement to the cross-head 5, may be disposed on a horizontal platform 13 secured to the upper ends of the guide bars 8 and the rear frame members 1', and may comprise an electric motor 14 connected to the high speed shaft 15 of a speed reducer 16 through a coupling 17, the low speed shaft 18 of said speed reducer having a crank or arm 19 provided with a connecting-rod 21 rotatably connected thereto, the other end of the rod 21 being pivotally secured to the crosshead 5 as at 22.

Feeding means are preferably provided at the rear of the device for feeding the block 3 forwardly into engagement with the blades 41, so as to continually offer fresh material to the action of said blades. The feeding means may comprise a pressure plate 23 disposed on the forward end of a feed-screw 24 and adapted to engage the rear end of the block 3. The screw 24 is disposed within a coactingly threaded ratchet collar 25 supported on a hanger 26 secured to the rearward frame cross-member 1", said ratchet collar being adapted to produce a forward movement of the screw 24 upon rotation of said collar in one direction. The collar 25 is provided with an operating arm 27, pivotally secured to the lower end of a connecting-rod 28 pivotally secured at its upper end to an adjustable throw crank 29 mounted on the rearward end of the low speed shaft 18 of the speed-reducer 16 and supported on the device through a bearing or hanger 31 disposed on the platform 13. It will be seen that rotation of the shaft 18 will produce an intermittent forward movement of the block 3.

Suitable means are preferably provided beneath the shaving blades for the purpose of receiving the particles produced thereby, such as a receptacle 33 adapted to rest upon and be supported by a plurality of rollers 34 provided with pins 35 rotatably disposed on longitudinal members 36 secured to the vertical frame members 1. Means are also provided for spraying a suitable medium upon the produced particles in order to promote the plastically interbonded condition of the particles according to this invention, such means conveniently being disposed below the container 2 and above the receptacle 33 as at 54 and which may comprise a rotating cylinder 55 provided with longitudinally extending slots 56, a distributing vane 57 secured to the periphery thereof and extending outwardly in a trailing direction adjacent each slot 56, a valved fluid inlet pipe 58 adapted to supply the spray medium to the interior of the cylinder 55, and an outer housing 59 provided with a longitudinal slot 60 through which the spray is directed laterally. The cylinder 55 is rotated at a relatively high speed, and the fluid supplied at 58 passes outwardly of the slots 56, thence along the respective distributing vanes 57, being discharged at the tips of the vanes in a thin film, which results in the production of a heavy mist directed outwardly of the device through the slot 60 into the descending mass of particles as shown at 68 in Fig. 7. A drain connection may be provided as at 59a, for carrying away such fluid as is thrown onto the side walls of the housing 59. Very accurate control of the quantity of fluid spray, i. e., the density of the mist of plasticizing medium, may be obtained by control of the quantity of fluid admitted at 58 to the interior of the cylinder 55, as by means of valve 58a, without change in the direction of application of such mist.

The cutting blades 41 are preferably of such shape and disposition that, for example, the lower blade may cut particles from the face of the block 3 during the upward stroke of the crosshead 5, and the upper blade may cut particles from the block during the downward stroke. The blades may further be so disposed that the cuttings taken during one stroke remove the projections remaining on the face of the block from the previous stroke.

The cutting blades may be of any suitable design to produce cuttings of the desired shape and size, and the blades shown, for example, may comprise strips provided with corrugations 41' and beveled at the cutting edge 41" (Figs. 3, 4 and 5), so as to provide a series of alternate projections and recesses, said projections being adapted to remove cuttings from the face of the block 3 when moved across the block in the manner described. The upper and lower blades are preferably so disposed with respect to one another that the projections of one blade are vertically opposite the recesses of the other, whereby the projections of one blade may remove cuttings during one stroke and the projections of the other blade may remove further cuttings during the other stroke. The blades 41 may be secured to the bladeholders 4 and 4' by means of a clamping plate 42 secured to said bladeholders in any suitable manner as, for example, by means of screws 43, so as to clamp the blade 41 between said plate and said bladeholder.

According to the method of the present invention, a body of argillaceous material in plastic or semi-plastic condition is positioned as at 3, and the device set in operation. The blades 41 will form a large number of individual particles during each stroke of the cross-head 5, and if the blades are properly set with relation to each other, substantially the same quantity of cuttings will be produced during each stroke. The steady production of the cuttings, each of which fall from substantially the same height, results in the formation of an evenly packed and distributed mass of individual particles at the position of the receptacle 33. The plasticizing spray from the fluid-medium distributing means 54 is caused to impinge upon the particles during their free fall to the receptacle, producing a highly plastic surface condition on each particle, which condition persists until the particles fall into the receptacle and come in contact with one another, resulting in the plastic interbonding of the particles at their points of contact, to form a pervious mass having a multiplicity of internal voids and in which the particles are arranged in contacting intersupporting plastically interbonded relation. The quantity of plasticizing medium introduced into contact with the particles is preferably adjusted at such a value with respect to the size of the particle and the moisture content of the argillaceous body from which the particles are formed, that the surface-plasticized condition of the particles is quickly dissipated by absorption of the surface-applied medium into the body portion of the particles, whereby the particles are converted into a relatively rigid and self-supporting condition within a few seconds after they fall into the receptacle, which results in a minimum sagging of the particles under their own weight within the receptacle.

The plasticizing medium supplied at 54 is preferably caused to travel transversely to the path of the particles, as shown in Fig. 7, so that substantially no fluid medium is allowed to enter the receptacle 33 into contact with the built-up mass of particles. This result is conveniently obtained by locating the supply means 54 at a position rearwardly of the path of the particles, and causing the spray to travel in substantially a horizontal direction forwardly through the downwardly moving stream of particles, and, as shown in Fig. 7, a guard member may be disposed as at 61, and provided with a drain or fluid outlet 61a at a position forwardly of the path of particles and above the position of the receptacle or other particle-receiving means. Fig. 7 illustrates the employment of a continuously moving belt member 62, provided with forming rolls 63 and 64, adapted to subject the aggregated mass 65 of particles to a forming operation in the production of a body of the desired width and thickness, which may afterwards be cut into the desired lengths in any suitable manner. The rolls 63 and 64 are preferably geared together as by means of bevel gears 67, and are rotated at a rate comparable to the speed of movement of the belt 62, through suitable driving means not shown.

The plasticizing medium supplied at 54 may comprise simply water, if desired, or may comprise a mixture of finely ground clay, water, and sodium silicate or other agent capable of affording slightly more strength to the bonded particles upon drying. A mixture which has been very satisfactorily used in this connection, consists of water 60 parts, finely divided plastic clay or slip 10 to 20 parts, and sodium silicate approximately 1 percent. The body of argillaceous material 3 may be such as to have a free-moisture content of from 15 to 30 percent, depending upon the plasticity of the clay. Clays of varying analysis may be employed, depending upon the character of finished product desired; an analysis of a typical clay which has been satisfactorily employed is as follows:

| | Percent |
|---|---|
| $H_2O$ (combined) | 11.84 |
| $Al_2O_3$ | 32.94 |
| $SiO_2$ | 50.14 |
| $Fe_2O_3$ | 3.06 |
| $TiO_2$ | 1.36 |
| $CaO$ | 0.24 |
| $MgO$ | 0.23 |
| $K_2O$ (combined) | 1.18 |
| | 100.99 |

One of the important advantages in the above-described method lies in the fact that a very inexpensive material may be used in the block 3. In the production of ceramic products, it is customary to grind a ceramic clay to a uniform fineness before the article is molded, but in the preparation of particles and pervious bodies according to the present process the block 3 may be of material as cut from the clay bed or mine, eliminating any grinding or other preparation thereof before the formation of the particles. There may be some difficulty with some types of clays, or clays from some sections of the clay bed, due to the presence of small stones, shells, or the like, but in general, clays may be obtained which are reasonably free from such contaminants, allowing the production of the particles from a particularly cheap raw material.

In particular, I have determined that clays which are entirely unsuited for ordinary use in the ceramic industry, by virtue of excessively high drying and firing shrinkage characteristics, may advantageously be employed according to the present process. The preparation of the pervious bodies by the plastic interbonding of a multiplicity of small particles arranged in inter-supporting relation promotes very rapid and uniform drying due to the excessively large surface area exposed for contact with air or other drying medium, so that unequal shrinkage of the body does not occur, and the porous nature of the dried material also renders the heat diffusion very uniform in the firing operation, which eliminates shrinkage difficulties in the firing operation.

It will be understood that, in the formation of the ceramic particles or bodies according to the present process, the product realized at the receptacle 33 or the belt member 62 is preferably allowed to dry, and is then subjected to a heat-firing operation to produce the desired ceramic condition, by a partial or complete vitrification procedure. It will be further appreciated that a combustible material such as petroleum coke, sawdust, or the like may be incorporated in the argillaceous material from which the particles are formed, which will subsequently be removed from such particles during the firing operation, in the production of intercommunicating and surface communicating voids in such particles.

I claim:
1. The method of preparing a fluid pervious ceramic body which comprises: subjecting a body of argillaceous material to plastic subdivision to form a plurality of discrete argillaceous particles; subjecting said particles to contact with an aqueous plasticizing medium to produce an increased plastic surface condition of said particles; placing said particles in contacting intersupporting plastically interbonded relation to form a pervious body having a multiplicity of internal voids, and then causing said particles to ceramically interbond by the application of heat to form an integral ceramic body.

2. The method set forth in claim 1, said plasticizing medium comprising an argillaceous slip material.

3. The method of preparing a fluid pervious ceramic body which comprises: subjecting a body of argillaceous material to plastic subdivision to form a plurality of discrete argillaceous particles; causing said particles to fall downwardly toward a receiving member; directing a mist of aqueous plasticizing medium transversely to the direction of fall of said particles and into contact therewith to produce a plastic surface condition thereof; collecting said particles at the position of said receiving member to form a pervious mass having a multiplicity of internal voids and in which said particles are arranged in contacting inter-supporting plastically interbonded relation; and subjecting said pervious mass to a firing operation to form an integral ceramic body.

4. The method set forth in claim 3, and comprising in addition, the step of molding the mass of said collected particles into block form while said particles possess said plastic surface condition.

EARNEST T. HERMANN.